United States Patent
Katsuragi

(10) Patent No.: US 8,998,396 B2
(45) Date of Patent: Apr. 7, 2015

(54) TREATMENT LIQUID FOR LIQUID JETTING DEVICE, AND CARTRIDGE CONTAINING THE SAME

(75) Inventor: Koji Katsuragi, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 474 days.

(21) Appl. No.: 13/395,315

(22) PCT Filed: Sep. 6, 2010

(86) PCT No.: PCT/JP2010/065683
§ 371 (c)(1),
(2), (4) Date: Mar. 9, 2012

(87) PCT Pub. No.: WO2011/030884
PCT Pub. Date: Mar. 17, 2011

(65) Prior Publication Data
US 2012/0169815 A1 Jul. 5, 2012

(30) Foreign Application Priority Data
Sep. 11, 2009 (JP) ................................. 2009-210010

(51) Int. Cl.
*B41J 2/01* (2006.01)
*C09D 11/54* (2014.01)
(Continued)

(52) U.S. Cl.
CPC ............... *C09D 11/54* (2013.01); *B41J 2/2107* (2013.01); *B41M 5/0011* (2013.01); *C09D 11/30* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/100, 95, 96, 9, 99, 88, 20, 21, 102, 347/103; 106/31.6, 31.13, 31.27; 523/160, 523/161
See application file for complete search history.

(56) References Cited

U.S. PATENT DOCUMENTS 5,879,439 A * 3/1999 Nagai et al. ................ 106/31.65
2002/0139270 A1 10/2002 Nitzan et al.
(Continued)

FOREIGN PATENT DOCUMENTS

CN 1890111 A 1/2007
CN 101132930 A 2/2008
(Continued)

OTHER PUBLICATIONS

Combined Office Action and Search Report issued Jul. 25, 2013 in Chinese Patent Application No. 201080040133.1 with English language translation.
(Continued)

Primary Examiner — Manish S Shah
(74) Attorney, Agent, or Firm — Oblon, McClelland, Maier & Neustadt, L.L.P.

(57) ABSTRACT

A liquid jetting device treatment liquid containing no colorant including a N-alkyl-2-pyrrolidone represented by the following General Formula 1: General Formula 1 where R represents an alkyl group having 8 to 11 carbon atoms.

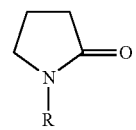

20 Claims, 6 Drawing Sheets

(51) Int. Cl.
  *B41J 2/21* (2006.01)
  *C09D 11/30* (2014.01)
  *B41M 5/00* (2006.01)

(56) References Cited

U.S. PATENT DOCUMENTS

| | | |
|---|---|---|
| 2006/0203056 A1 | 9/2006 | Furukawa et al. |
| 2007/0120928 A1 | 5/2007 | Ma et al. |
| 2007/0225185 A1 | 9/2007 | Kasai |
| 2008/0152825 A1* | 6/2008 | Mukai et al. ............... 106/287.2 |
| 2009/0219330 A1* | 9/2009 | Kiyomoto et al. ............ 347/100 |
| 2010/0126529 A1 | 5/2010 | Seki et al. |
| 2010/0295891 A1* | 11/2010 | Goto et al. ...................... 347/21 |
| 2011/0279517 A1 | 11/2011 | Katsuragi |
| 2011/0287236 A1* | 11/2011 | Nakano et al. ................... 347/20 |

FOREIGN PATENT DOCUMENTS

| | | |
|---|---|---|
| CN | 101316905 A | 12/2008 |
| CN | 101519006 A | 9/2009 |
| JP | 2006 181810 | 7/2006 |
| JP | 2007 254546 | 10/2007 |
| JP | 2007 331181 | 12/2007 |
| JP | 2008 087457 | 4/2008 |
| JP | 4092583 | 5/2008 |
| JP | 2008 274016 | 11/2008 |
| WO | 03 097717 | 11/2003 |
| WO | WO 2009/091079 A1 | 7/2009 |

OTHER PUBLICATIONS

International Search Report issued on Nov. 9, 2010 in PCT/JP10/065683 filed on Sep. 6, 2010.

* cited by examiner

TREATMENT LIQUID FOR LIQUID JETTING DEVICE, AND CARTRIDGE CONTAINING THE SAME

CROSS REFERENCE TO RELATED APPLICATION

This application is a 371 of PCT/JP2010/065683, filed on Sep. 6, 2010, and claims priority to Japanese Patent Application 2009-210010, filed on Sep. 11, 2009.

TECHNICAL FIELD

The present invention relates to a treatment liquid for a liquid jetting device (liquid jetting device treatment liquid) and to a cartridge containing the same.

BACKGROUND ART

PTL 1 discloses a compound having a Griffin's HLB value of 10 to 16 and represented by the following General Formula (1): $C_nF_{2n+1}$—$CH_2CH(OH)CH_2O$—$(CH_2CH_2O)_a$—Y (1), where n is an integer of 2 to 6, a is an integer of 15 to 50, Y represents —$C_bH_{2b+1}$ (b is an integer of 11 to 19) or —$CH_2CH(OH)CH_2$—$C_mF_{2m+1}$ (m is an integer of 2 to 6). PTL 1 also discloses that the above compound serves as a surfactant, and can be used in aqueous paint compositions, aqueous ink compositions and photosensitive photographic materials. However, there is a concern that this compound may decrease surface tension when used even in small amounts. Also, the compound has a disadvantage in that, once foam has been generated, the foam does not disappear altogether.

PTL 2 discloses a composition containing N-methyl-2-pyrrolidone (NMP) which is for cleaning nozzles of inkjet printers. However, since the surfactant properties of NMP are low, it is inferior in paper permeability as well as wetability with respect to the interior flowpath of liquid jetting devices.

PTL 3 discloses a filling liquid for ink supplying systems which is supplied to inkjet apparatuses and contains a fluorine-containing surfactant and an organic solvent having a boiling point of 150° C. or higher. In PTL 3, a perfluoroalkyl ethylene oxide additive is exemplified as the fluorine-containing surfactant, and an N-methyl-2-pyrrolidone is exemplified as the organic solvent.

While these fluorine-containing surfactant and organic solvent are used in the filling liquid for ink supplying systems, PTL 3 does not suggest use of them as a treatment liquid for inkjet apparatuses.

Also, in general, fluorine-containing surfactants have a disadvantage in that, once foam has been generated, it is difficult to eliminate the foam. Thus, variations in coating arise due to air bubbles.

One feature required for a liquid jetting device treatment liquid is the abilities to be appropriately wettable to media and to be uniformly jetted or coated thereonto. By allowing the treatment liquid to have appropriate wetability, it is possible to improve the penetration speed at which the treatment liquid penetrates media, and it becomes possible to improve ablation resistance and overcome such problems as bleeding. In particular, permeability of a treatment liquid with respect to media is of great importance. If such permeability is low, a large amount of the treatment liquid will remain in the vicinity of the medium surface. As a result, when the treatment liquid comes into contact with a colorant-containing second jetting liquid on the medium surface, the acid or multivalent metal salts in the treatment liquid and the carboxyl group-containing resin (enveloping the colorant) in the second jetting liquid start an excessive aggregation reaction, which leads to insufficient embedding of the solid image due to reduction in dot diameter. There is also a problem with ablation resistance due to an excessive amount of colorant components remaining on the medium surface.

Adding a surfactant to reduce surface tension and thereby improve wetability of the treatment liquid is generally performed. Among others, fluoroalkyl group-containing surfactants are known to have an ability to considerably reduce the surface tension when solved in water, and are thus widely used in liquids for liquid jetting devices. However, the aspect of having high surfactant ability means that micelle is easily formed between surfactants, which as a result, leads to a disadvantage of foam being formed easily.

Many problems in the system will follow once foam is formed. For example, air bubbles are generated in the subtank as a result of vibration of liquid during printing operation in movable-head type printers, and will lead to problems with rising of the ink level within the subtank which can cause erroneous ink level gauging. And when bubbles are mixed into the treatment liquid during application of the treatment liquid onto media, coating variation will occur, leading to problems in variation in image density.

In order to solve this problem of foam generation, there is a generally known method of forcefully eliminating generated foam bubbles by adding a silicone-based defoamant as described in Japanese Patent Application Laid-Open (JP-A) No. 2009-001741. The mechanism of the foam bubble elimination is that foam bubbles are eliminated when the defoamant penetrates the bubble lamellar film and scatters thereby replacing surfactant with defoamant. For this to occur, the defoamant must be non-compatible with the system. In general, a hydrophobic silica or polyurea is added to a water-based defoamant as an active ingredient, and though it is hydrophobic and thus will exist in a state dispersed as particles which do not solve in the system, it can cause filter clogging and thus, preferably, no defoamant is used.

As described above, since wetability and foam generation go hand in hand, it has been difficult to satisfy both without problems.

CITATION LIST

Patent Literature

PTL 1: International Publication No. WO2003/097717
PTL 2: Japanese Patent Application Laid-Open (JP-A) No. 2006-181810
PTL 3: JP-A No. 2007-331181

SUMMARY OF INVENTION

Technical Problem

An object of the present invention is to provide a liquid jetting device treatment liquid able to remarkably suppress foam generation without using a defoamant and having satisfactory wetability, and a cartridge containing the treatment liquid.

Solution to Problem

<1> A liquid jetting device treatment liquid containing no colorant including:
an N-alkyl-2-pyrrolidone represented by the following General Formula 1:

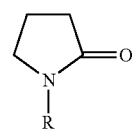

General Formula 1 where R represents an alkyl group having 8 to 11 carbon atoms.

<2> The liquid jetting device treatment liquid according to <1>, further including a fluorine-containing surfactant.

<3> The liquid jetting device treatment liquid according to <2>, wherein the fluorine-containing surfactant is a compound having a Griffin's HLB value of 10 to 16 and represented by the following General Formula 2:

$$C_nF_{2n+1}-CH_2CH(OH)CH_2O-(CH_2CH_2O)_a-Y \quad \text{General Formula 2}$$

where n is an integer of 2 to 6, a is an integer of 15 to 50, Y represents —$C_bH_{2b+1}$, where b is an integer of 11 to 19; or —$CH_2CH(OH)CH_2$—$C_mF_{2m+1}$, where m is an integer of 2 to 6.

<4> The liquid jetting device treatment liquid according to one of <2> and <3>, wherein the fluorine-containing surfactant is a compound represented by the following General Formula 3:

$$C_4F_9-CH_2CH(OH)CH_2O-(CH_2CH_2O)_{23}-CH_2CH(OH)CH_2-C_4F_9 \quad \text{General Formula 3.}$$

<5> The liquid jetting device treatment liquid according to any one of <1> to <4>, wherein the N-alkyl-2-pyrrolidone is N-octyl-2-pyrrolidone.

<6> The liquid jetting device treatment liquid according to any one of <2> to <5>, wherein the amount of the fluorine-containing surfactant is 40% by mass or less with respect to the total amount of the fluorine-containing surfactant and the N-alkyl-2-pyrrolidone.

<7> The liquid jetting device treatment liquid according to any one of <2> to <6>, wherein the total amount of the fluorine-containing surfactant and the N-alkyl-2-pyrrolidone is 2% by mass or less with respect to the total amount of the liquid jetting device treatment liquid.

<8> The liquid jetting device treatment liquid according to any one of <1> to <7>, further including an acid.

<9> The liquid jetting device treatment liquid according to <8>, wherein the acid is lactic acid.

<10> The liquid jetting device treatment liquid according to any one of <1> to <9>, further including a multivalent metal salt.

<11> The liquid jetting device treatment liquid according to <10>, wherein the multivalent metal salt is calcium chloride.

<12> The liquid jetting device treatment liquid according to any one of <1> to <11>, further including a water-soluble organic solvent.

<13> The liquid jetting device treatment liquid according to <12>, wherein the water-soluble organic solvent contains at least one of glycerin and 1,3-butylene glycol.

<14> The liquid jetting device treatment liquid according to any one of <1> to <13>, wherein the amount of the N-alkyl-2-pyrrolidone is 0.05% by mass or more with respect to the total amount of the liquid jetting device treatment liquid.

<15> A cartridge including:
a container,
the liquid jetting device treatment liquid according to any one of <1> to <14>, which is housed in the container.

<16> An image forming apparatus including:
the cartridge according to <15>.

Advantageous Effects of Invention

The present invention can provide a liquid jetting device treatment liquid able to remarkably suppress foam generation without using a defoamant and having satisfactory wetability, and a cartridge containing the treatment liquid.

Also, since the liquid jetting device treatment liquid of the present invention contains N-alkyl-2-pyrrolidone and, optionally, a fluorine-containing surfactant, sufficient wetability can be maintained while eliminating the issue of coating variation caused by foaming.

Further, the liquid jetting device treatment liquid of the present invention can remarkably suppress foam generation without using a defoamant, while maintaining an ability to reduce surface tension of the fluorine-containing surfactant.

DESCRIPTION OF EMBODIMENTS

Liquid Jetting Device Treatment Liquid

Figure 1:
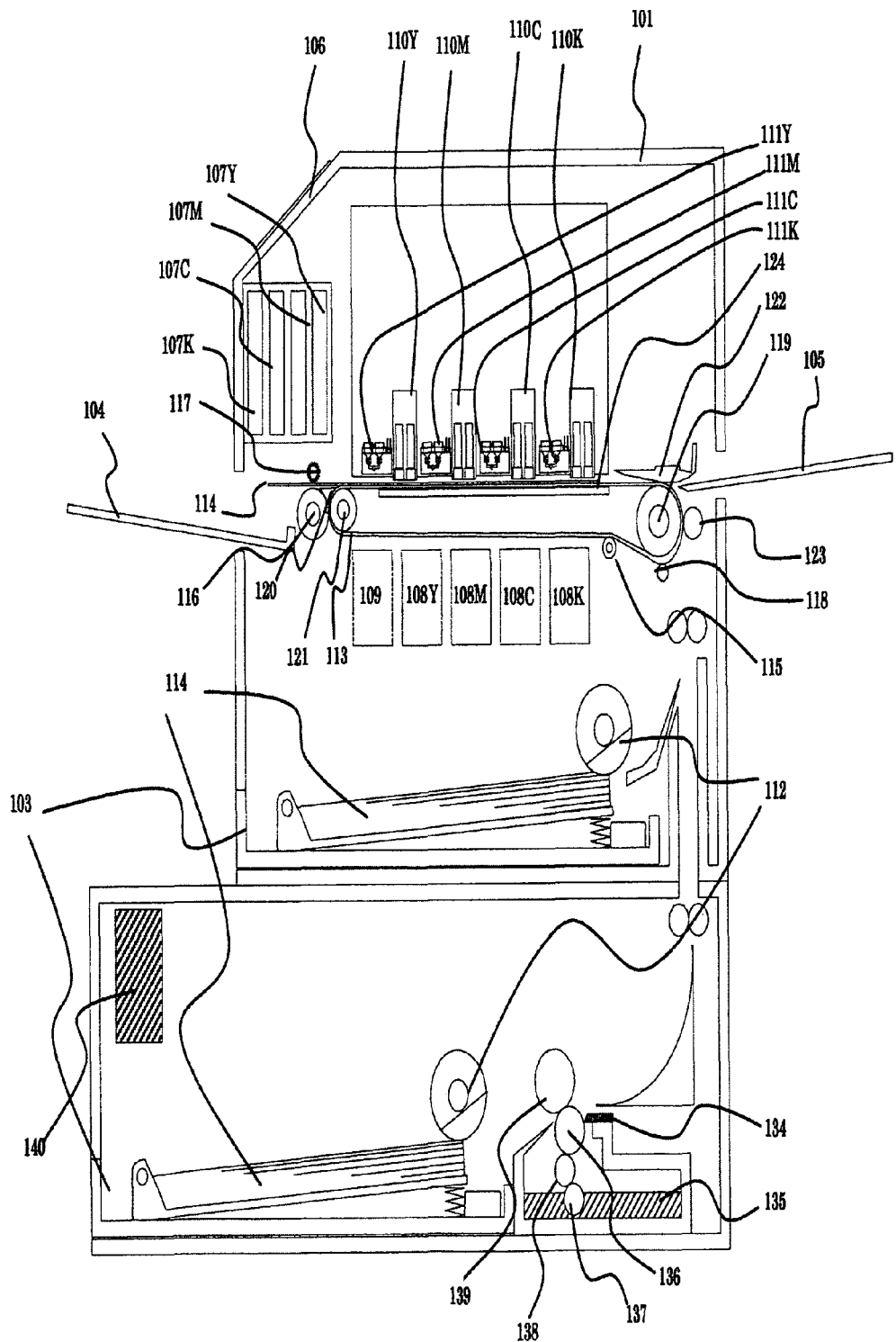
FIG. 1 is a schematic side view of one example of an image forming apparatus according to the present invention.

A liquid jetting device treatment liquid of the present invention is a liquid jetting device treatment liquid containing no colorant which includes at least N-alkyl-2-pyrrolidone, or, both the N-alkyl-2-pyrrolidone and a fluorine-containing surfactant, and if needed, may include other components as well.
<Fluorine-Containing Surfactant>

The fluorine-containing surfactant used in the present invention is preferably represented by the following General Formula 2:

$$C_nF_{2n+1}-CH_2CH(OH)CH_2O-(CH_2CH_2O)_a-Y \quad \text{General Formula 2}$$

(where n is an integer of 2 to 6, a is an integer of 15 to 50, Y represents —$C_bH_{2b+1}$ (where b is an integer of 11 to 19) or —$CH_2CH(OH)CH_2$—$C_mF_{2m+1}$ (where m is an integer of 2 to 6)), and has a Griffin's HLB value of 10 to 16.

In the fluorine-containing surfactant represented by General Formula 2, n is an integer of 2 to 6, preferably 4 to 6, still more preferably 4. When n is 7 or more, the compound expressed by the General Formula 2 is considerably decreases in water solubility, and does not solve in water. From the standpoint of obtaining desirable surfactant properties, n is preferably 2 or more, more preferably 4 or more. In particular, from the standpoint of obtaining desirable water solubility, surfactant properties, and biodegradability after release in the environment, n is most preferably 4. Moreover, the number of "a" affects the water solubility of the compound expressed by General Formula 2. When the above fluorine-containing surfactant is used in aqueous paint compositions, aqueous ink compositions or photosensitive photographic materials, a is preferably about 20 to about 45, more preferably about 20 to about 25. The HLB value shows the balance between hydrophilic groups and lipophilic groups contained in the surfactant, and has a range of 0 to 20 where the value closer to 0 shows the higher lipophilicity and the value closer to 20 shows the higher hydrophilicity. There are several calculation formulae for obtaining this value, but in the present invention, the method proposed by Griffin is used. In the present invention, when the Griffin's HLB value is 10 or lower, it may be difficult for the surfactant to be solved or dispersed in a solvent. When the Griffin's HLB value is 16 or higher, the lipophilic group becomes ineffective. Thus, it is preferable if the Griffin's HLB value of the fluorine-containing surfactant used in the present invention is in the range of 10 to 16.

Among others, the surfactants having the following structures set forth below are particularly desirable.

Specifically, preferred fluorine-containing surfactants are given below.

$C_4F_9$—$CH_2CH(OH)CH_2O$—$(CH_2CH_2O)_{23}$—$CH_2CH(OH)$ $CH_2$—$C_4F_9C_4F_9$—$CH_2CH(OH)CH_2O$—$(CH_2CH_2O)_{35}$—$CH_2CH(OH)CH_2$—$C_4F_9C_4F_9$—$CH_2CH(OH)CH_2O$—$(CH_2CH_2O)_{45}$—$CH_2CH(OH)CH_2$—$C_4F_9C_3F_7$—$CH_2CH(OH)CH_2O$—$(CH_2CH_2O)_{23}$—$CH_2CH(OH)CH_2$—$C_3F_7C_6F_{13}$—$CH_2CH(OH)CH_2O$—$(CH_2CH_2O)_{23}$—$CH_2CH(OH)CH_2$—$C_6F_{13}C_4F_9$—$CH_2CH(OH)CH_2O$—$(CH_2CH_2O)_{25}$—$C_{16}H_{33}$

Of these, the compound having the below-given Structural Formula (3) is particularly preferred.

$$C_4F_9\text{—}CH_2CH(OH)CH_2O\text{—}(CH_2CH_2O)_{23}\text{—}CH_2CH(OH)CH_2\text{—}C_4F_9 \quad (3)$$

These fluorine-containing surfactants do not contain perfluorooctanesulfonic acid (PFOS) or perfluorooctanoic acid (PFOA), and thus it is advantageous as it is environmentally friendly.

However, these fluorine-containing surfactants have extremely high surfactant property. Therefore, when such a surfactant is used alone, air bubbles are significantly formed in the ink even though a defoamant is added to the ink as has conventionally been often done, and the formed bubbles do not disappear. In the present invention, N-alkyl-2-pyrrolidone is added for preventing the generation of bubbles.

<N-Alkyl-2-Pyrrolidone>

The above N-alkyl-2-pyrrolidone is a compound represented by the following General Formula 1:

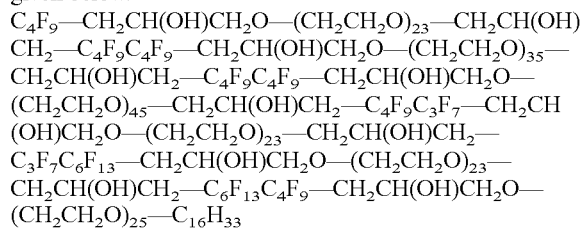

General Formula 1 where R represents an alkyl group having 8 to 11 carbon atoms.

When the N-alkyl-2-pyrrolidone has a long alkyl chain, in other words, if the alkyl group has 12 or more carbon atoms, water solubility thereof is significantly low, and it does not solve in water. On the other hand, when the N-alkyl-2-pyrrolidone has a too short alkyl chain, in other words, if the alkyl group has 7 or less carbon atoms, it decreases in defoaming properties. In particular, N-octyl-2-pyrrolidone is preferred.

N-octyl-2-pyrrolidone has a small HLB value of 6, and is a low-foamable nonionic surfactant. Therefore, N-octyl-2-pyrrolidone itself functions as a surfactant. It also exhibits extremely excellent effects with regard to foaminess. Compared to the fluorine-containing surfactants, the surfactant property thereof is low, but depending on the type (penetration level) of recording media, it is possible to use an N-alkyl-2-pyrrolidone alone such as N-octyl-2-pyrrolidone. However, in the case of using the N-alkyl-2-pyrrolidone alone, the amount thereof is preferably 1% by mass or less, particularly preferably 0.5% by mass or less, in view of surface tension considerations.

The liquid jetting device treatment liquid (hereinafter referred to simply as a "treatment liquid") must increase the permeability to recording media in order to ensure ablation resistance as described above. In the case using a second jetting liquid containing a colorant, if the permeability thereof is too high, it becomes difficult for the colorant to remain in the vicinity of the recording medium surface, and the colorant leaks to the rear side of the recording medium (strike-through), which is problematic.

On the other hand, issues of insufficient image embedding will also arise if the treatment liquid remains in the vicinity of the recording medium surface, and thus it is necessary to configure it so as to have a higher permeability with respect to the recording medium. Also, in order to prevent strike-through of the second jetting liquid containing the colorant, it is preferable if the surface tension of the treatment liquid be lower than the surface tension of the second jetting liquid. When the viscosity or surface tension of the treatment liquid are reduced, the permeability with respect to the recording medium will rise considerably, and so by making the colorless transparent treatment liquid penetrate through to the rear of the recording medium, the front and rear surfaces of the recording medium can be treated in one coating thereof, which makes it possible to improve image density for double-sided printing and also prevent strike-through of the colorant.

Although the surface tension of the treatment liquid of the present invention is decided by the ratio of the fluorine-containing surfactant and the N-alkyl-2-pyrrolidone, in cases where it is necessary to reduce surface tension of the treatment liquid depending on the recording medium to be used, the amount of the fluorine-containing surfactant must be high. However, since the aforementioned problem of foaming may occur, the amount of the fluorine-containing surfactant is preferably 40% by mass or less, more preferably 30% by mass or less, with respect to the total mass of the fluorine-containing surfactant and the N-alkyl-2-pyrrolidone.

The total amount of the fluorine-containing surfactant and N-alkyl-2-pyrrolidone in the present invention is preferably 2% by mass or less, more preferably 1% by mass or less, with respect to the total mass of the liquid jetting device treatment liquid. This is because, as described above, it is necessary to raise the permeability to the recording medium to be higher than the second jetting liquid containing the colorant. Simply setting the amount to be higher than the above amount will not produce desired effect of greatly reducing the surface tension, and could also lead to issues with poor storage and cost elevation, and is thus deemed undesirable.

<Other Components>

The above other components are not particularly limited, and may be appropriately selected depending on the intended purpose. Examples of the other components include water-soluble organic solvents, acids and multivalent metal salts.

<Water-Soluble Organic Solvent>

The water-soluble organic solvent may be used to ensure proper storage of the liquid jetting device treatment liquid. Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate and ethylene carbonate.

Examples of the polyhydric alcohol include glycerin, 1,3-butylene glycol, 3-methyl-1,3-butandiol, 1,5-pentandiol, 1,6-hexandiol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylol ethane, trimethylol propane, glycerol, 1,2,3-butantriol, 1,2,4-butantriol, 1,2,6-hexantriol and petriol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether.

Examples of the polyhydric alcohol aryl ethers include ethylene glycol monophenyl ether, and ethylene glycol monobenzyl ether.

Examples of the amine include monoethanol amine, diethanol amine, triethanol amine, monoethyl amine, diethyl amine and triethyl amine.

Examples of the sulfur-containing compound include dimethyl sulfoxide, sulfolane and thiodiethanol.

Among these water-soluble solvents, glycerin, diethylene glycol, 1,3-butylene glycol, and 3-methyl-1,3-butandiol are particularly preferable. These have excellent solubility and exhibit excellent effect of preventing jetting failure due to moisture evaporation. Moreover, use of these water-soluble solvents provides a liquid jetting device treatment liquid having excellent storage stability and jetting stability.

<Acid and Multivalent Metal Salt>

It is also acceptable to add at least one of the acid and the multivalent metal salt to the treatment liquid of the present invention. The acid is preferably organic acids having a carboxyl group in the structure thereof. Organic acids are produced in the body or contained in food products, and do not accumulate in the human body. Also, many of them are odorless, making them desirable for use in image forming apparatuses in home and office. Specifically, succinic acid, citric acid, malic acid, tartaric acid and lactic acid are preferred. Examples of the role the acid plays in the present invention include aggregation of pigment on recording media through reaction with the carboxyl group-containing resin in aqueous ink compositions. Here, if the amount of the acid added in the treatment liquid is large, aggregation effects will increase due to the reaction with the carboxyl group-containing resin in aqueous ink compositions, leading to a smaller dot diameter on the recording medium. This is an indication that the spreading of the dot is decreasing, and if embedding at the solid portion in particular becomes insufficient, such problems that the base color of the recording medium showing up in the image. Therefore, it is necessary to decide the amount of the acid added with respect to the treatment liquid to an extent at which no problems arise with the image. It is preferable for the amount of the acid to be 20% by mass or less, more preferably 10% by mass or less, with respect to the liquid jetting device treatment liquid.

Examples of the multivalent metal salt used in the present invention include salts formed between multivalent metal ions such as aluminum ion, barium ion, calcium ion, copper ion, iron ion, magnesium ion, manganese ion, nickel ion, stannum ion, titanium ion and zinc ion and acids such as hydrochloric acid, hydroiodic acid, sulfuric acid, nitric acid, phosphoric acid, thiocyanic acid, organic carboxylic acids (e.g., acetic acid, oxalic acid, lactic acid, fumaric acid, citric acid, salicylic acid and benzoic acid) and organic sulfonic acids.

Multivalent metal salts have a great effect in causing constituent components contained in aqueous recording inks to aggregate, and also has great effects relating to improvement of optical density, bleeding, and color bleeding. Multivalent metal salts can be used individually or in combination. Some multivalent metal ions are desirable depending on the type of polysaccharide polymer used. For example, when using sodium alginate, calcium ions, barium ions, aluminum ions and the like are desirable.

Similar to the case of the acid, if the amount of the multivalent metal salt added is too large, such problems that increased aggregation effects of the pigment will occur, and thus, it is desirable if the amount of the multivalent metal salt added is 20% by mass or less, more preferably 10% by mass or less, with respect to the liquid jetting device treatment liquid.

-Aqueous Recording Ink-

Although the aqueous recording ink includes at least a colorant, a water-soluble organic solvent, a surfactant and water, it is desirable if it further contains a carboxyl group-containing resin.

--Colorant--

Known dyes and pigments can be used as the colorant of the aqueous recording ink. It is also acceptable to use colorant particles of inorganic particles covered with an organic pigment or carbon black.

Examples of the method of coating the inorganic particles with carbon black include a method of drying in liquid by coagulation, precipitation, or the like; and a drying-mixing method in which a mechanical force is applied while mixing. Further examples of the method of coating the inorganic particles with an organic pigment include a method in which an organic pigment is precipitated in the presence of inorganic particles; and a method in which inorganic particles and an organic pigment are mechanically mixed and ground. When inorganic particles are coated with the organic pigment that is excellent in thermal stability, chemical deposition can be used for coating. Moreover, if necessary, an organosilane compound layer formed of polysiloxane or alkyl silane can be provided between the inorganic particles and the organic pigment, so that adhesion therebetween can be improved.

Examples of the inorganic particles include titanium dioxide, silica, alumina, iron oxide, iron hydroxide and tin oxide. Regarding the shape of each inorganic particle, the aspect ratio is preferably smaller. The inorganic particle particularly preferably has a spherical shape. In the case where a colored colorant is adsorbed on the surface of the inorganic particle, the inorganic particle is preferably colorless transparent or white. In the case where a black colorant is adsorbed thereon, black inorganic particles may be used.

The primary particle diameter of the inorganic particles is preferably 100 nm or less, more preferably 5 nm to 50 nm.

Examples of the organic pigment for coating the inorganic pigments include black pigments such as aniline black; and color pigments such as anthraquinone, phthalocyanine blue, phthalocyanine green, diazo, monoazo, pyranthrone, perylene, heterocyclic yellow, quinacridone and (thio)indigoid.

Among them, phthalocyanine pigments, quinacridone pigments, monoazo yellow pigments, diazo yellow pigments and heterocyclic yellow pigments are particularly preferable in view of their coloring properties.

Examples of the phthalocyanine pigment include copper phthalocyanine blue or derivatives thereof (C.I. Pigment Blue 15:3, and C.I. Pigment Blue 15:4), and aluminum phthalocyanine.

Examples of the quinacridone pigment include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, C.I. Pigment Violet 19 and C.I. Pigment Violet 42.

Examples of the monoazo yellow pigment include C.I. Pigment Yellow 74, C.I. Pigment Yellow 109, C.I. Pigment Yellow 128 and C.I. Pigment Yellow 151.

Examples of the diazo yellow pigment include C.I. Pigment Yellow 14, C.I. Pigment Yellow 16 and C.I. Pigment Yellow 17.

Examples of the heterocyclic yellow pigment include C.I. Pigment Yellow 117 and C.I. Pigment Yellow 138.

The ratio by mass (inorganic particles/colorant) of the inorganic particles to the colorant (e.g., an organic pigment and carbon black) is preferably 3/1 to 1/3, more preferably 3/2 to 1/2. When the proportion of the colorant is too small, coloring properties and/or coloring ability of the coated particles may be decreased. When the proportion of the colorant is too large, the coated particles may be degraded in transparency or color tone.

Examples of commercially available colorant particles in which inorganic particles are each coated with an organic pigment or carbon black include silica/carbon black composite materials, silica/phthalocyanine C.I. Pigment Blue 15:3 composite materials, silica/diazo yellow composite materials, and silica/quinacridone C.I. Pigment Red 122 composite materials, all of which are manufactured by Toda Kogyo Corp. These materials have a small primary particle diameter, and thus are suitably used.

For example, if inorganic pigments having a primary particle diameter of 20 nm are coated with an equiamount of an organic pigment, the coated particles will have a primary diameter of approximately 25 nm. Therefore, provided that these particles are dispersed maintaining the state of primary particles by using an appropriate dispersant, an extremely finely dispersed pigment ink having a dispersed particle diameter of 25 nm can be obtained.

The primary diameter of the colorant particles in the aqueous recording ink is preferably 5 nm to 100 nm, more preferably 30 nm to 80 nm. When the primary diameter thereof is less than 5 nm, the resulting ink may increase in viscosity after a long period of storage, or the colorant particles may cause aggregations. When the primary diameter thereof is more than 100 nm, in the case where the resulting ink is used to print on a medium such as a piece of paper or a film, the obtained print may have a printed portion which has low color saturation and brightness. Note that, the primary particle diameter of the colorant particles means a minimum unit for the colorant particle that cannot be mechanically pulverized any smaller.

The amount of the colorant particles contained in the aqueous recording ink is preferably 1% by mass to 20% by mass, more preferably 2% by mass to 15% by mass.

--Water-Soluble Organic Solvent--

The aqueous recording ink in the present invention uses water as a solvent, but may further contain a water-soluble organic solvent in combination for the purposes of, for example, preventing the ink from being dried and increasing dispersion stability. As the water-soluble organic solvent, two or more thereof may be used in combination.

Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate and ethylene carbonate.

Examples of the polyhydric alcohol include glycerin, 1,3-butylene glycol, 3-methyl-1,3-butandiol, 1,5-pentandiol, 1,6-hexandiol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylol ethane, trimethylol propane, glycerol, 1,2,3-butantriol, 1,2,4-butantriol, 1,2,6-hexantriol and petriol.

Examples of the polyhydric alcohol alkyl ether include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether.

Examples of the polyhydric alcohol aryl ether include ethylene glycol monophenyl ether and ethylene glycol monobenzyl ether.

Examples of the nitrogen-containing heterocyclic compound include 2-pyrrolidone, N-methyl-2-pyrrolidone, N-hydroxyethyl-2-pyrrolidone, 1,3-dimethylimidazolidinone, ε-caprolactam and γ-butyrolactone.

Examples of the amine include monoethanol amine, diethanol amine, triethanol amine, monoethyl amine, diethyl amine and triethyl amine.

Examples of the sulfur-containing compound include dimethyl sulfoxide, sulfolane and thiodiethanol.

Among these water-soluble solvents, glycerin, diethylene glycol, 1,3-butylene glycol and 3-methyl-1,3-butandiol are particularly preferable. These have excellent solubility and exhibit excellent effect of preventing jetting failure due to moisture evaporation. Moreover, use of these water-soluble solvents provides an aqueous recording ink having excellent storage stability and jetting stability.

The formulation ratio of the colorant particles and the water-soluble organic solvent strongly affect stability of ink jetted from heads. If the amount of the water-soluble organic solvent is smaller than the solid content of the pigment, moisture evaporation is encouraged around the ink meniscus of nozzles, which causes jetting failures.

The aqueous recording ink optionally further contains another water-soluble organic solvent in combination with the aforementioned water-soluble organic solvent. Such water-soluble organic solvent used in combination is, for example, sugars and derivatives thereof. Examples of the sugars include monosaccharides, disaccharides, oligosaccharides (including trisaccharides and tetrasaccharides), polysaccharides, and derivatives thereof. Specific examples thereof include glucose, mannose, fructose, ribose, xylose, trehalose and maltotriose. Here, "polysaccharide" means sugar in a broad sense, and include compounds widely present in nature, such as α-cyclodextrin and cellulose.

Examples of the derivatives of the sugars include reducing sugars and oxidized sugars of the aforementioned sugars. Among them, sugar alcohols are preferable. Specific examples thereof include maltitol and sorbitol.

The amount of the sugar is preferably 0.1% by mass to 40% by mass, more preferably 0.5% by mass to 30% by mass relative to the total amount of the aqueous recording ink.

--Surfactant--

The surfactant may be appropriately selected depending on the intended purpose without any restriction, provided that it does not adversely affect dispersion stability of the ink when used in combination with a colorant, a wetting agent or a penetrant. In the case where the aqueous recording ink is used for printing on a printing paper, a fluorine-containing surfactant or silicone surfactant having low surface tension and high leveling property is preferable, and the fluorine-containing surfactant is particularly preferable.

As the fluorine-containing surfactant, for example, a perfluoroalkyl sulfonic acid compound, a perfluoroalkyl carboxylic acid compound, a perfluoroalkyl phosphate compound, a perfluoroalkyl ethylene oxide adduct, and a polyoxyalkylene ether polymer compound having a perfluoroalkyl ether group in the side chain thereof are particularly preferable, as they have little foamability.

Examples of the perfluoroalkyl sulfonic acid compound include perfluoroalkyl sulfonic acids, and perfluoroalkyl sulfonic acid salts.

Examples of the perfluoroalkyl carboxylic acid compound include perfluoroalkyl carboxylic acids, and perfluoroalkyl carboxylic acid salts.

Examples of the perfluoroalkyl phosphate compound include perfluoroalkyl phosphates and perfluoroalkyl phosphate salts.

Examples of the polyoxyalkylene ether polymer compound having a perfluoroalkyl ether group in the side chain thereof include sulfuric acid ester salts of polyoxyalkylene ether polymer having a perfluoroalkyl ether group in the side chain thereof, and salts of polyoxyalkylene ether polymer having a perfluoroalkyl ether group in the side chain thereof.

Examples of the counter ion in the salts in these fluorine-containing surfactants include Li, Na, K, $NH_4$, $NH_3CH_2CH_2OH$, $NH_2(CH_2CH_2OH)_2$ and $NH(CH_2CH_2OH)_3$.

The fluorine-containing surfactant may be selected from those appropriately synthesized or commercially available products. Examples of the commercially available products include: SURFLON series manufactured by ASAHI GLASS CO., LTD (S-111, S-112, S-113, S-121, S-131, S-132, S-141 and S-145); FLUORAD series manufactured by Sumitomo 3M Limited (FC-93, FC-95, FC-98, FC-129, FC-135, FC-170C, FC-430 and FC-431), MEGAFAC series manufactured by DIC Corporation (F-470, F-1405 and F-474); Zonyl TBS, FSP, FSA, FSN-100, FSN, FSO-100, FSO, FS-300 and UR, manufactured by DuPont; FT-110, FT-250, FT-251, FT-252, FT-400S, FT-150 and FT-400SW, manufactured by NEOS COMPANY LIMITED; and PF-151N manufactured by Omnova Solutions, Inc. Among them, from the viewpoints of improving printing quality, especially, coloring properties and uniform coloring properties, particularly preferred are FT-110, FT-250, FT-251, FT-400S, FT-150 and FT-400SW (manufactured by NEOS COMPANY LIMITED) and PF-151N (manufactured by Omnova Solutions, Inc).

The silicone surfactant is suitably selected depending on the intended purpose without any restriction. In particular, silicone surfactants which do not decompose at high pH are preferable. Examples thereof include side chain-modified polydimethylsiloxanes, both terminal-modified polydimethylsiloxane, one terminal-modified polydimethylsiloxane, and side chain and both terminal-modified polydimethylsiloxane. Among them, those having, as a modified group, a polyoxyethylene group or polyoxyethylene polyoxypropylene group are particularly preferable, since they have excellent properties as an aqueous surfactant.

The silicone surfactant may be selected from appropriately synthesized compounds, or commercially available products. As the commercially available products, for example, silicone surfactants manufactured by BYK-Chemie Co., Shin-Etsu Chemical Co., Ltd., and Dow Corning Toray Co., Ltd. are readily available.

Moreover, as the silicone surfactant, a polyether-modified silicone surfactant can be used, and examples thereof include compounds in which a polyalkylene oxide structure is introduced into the Si-containing side chain of dimethyl siloxane.

The polyether-modified silicone compound may be selected from appropriately synthesized compounds or commercially available products. Examples of the commercial available products include KF-618, KF-642 and KF-643, all of which are manufactured by Shin-Etsu Chemical Co., Ltd.

Other than the fluorine-containing surfactant and silicone surfactant, an anionic surfactant, a nonionic surfactant, an amphoteric surfactant and the like may be used.

Examples of the anionic surfactant include acetic acid salts of polyoxyethylene alkyl ethers, dodecylbenzene sulfonic acid salts, succinic acid ester sulfonic acid salts, lauric acid salts, and salts of polyoxyethylene alkyl ether sulfates.

Examples of the nonionic surfactant include acetylene glycol surfactants, polyoxyethylene alkyl ethers, polyoxyethylene alkyl phenyl ethers, polyoxyethylene alkyl esters, and polyoxyethylene sorbitan fatty acid esters.

Examples of the acetylene glycol surfactant include 2,4,7,9-tetramethyl-5-decyn-4,7-diol, 3,6-dimethyl-4-octyn-3,6-diol, and 3,5-dimethyl-1-hexyn-3-diol. Moreover, examples of commercially available products thereof include SURFYNOL series manufactured by Air Products and Chemicals, Inc. (104, 82, 465, 485 and TG).

Examples of the amphoteric surfactant include lauryl amino propionic acid salts, lauryl dimethyl betaine, stearyl dimethyl betaine, lauryl dihydroxyethyl betaine, lauryl dimethyl amine oxide, myristyl dimethyl amine oxide, stearyl dimethyl amine oxide, dihydroxyethyl lauryl amine oxide, polyoxyethylene coconut oil alkyldimethyl amine oxide, dimethylalkyl (coconut) betaine and dimethyl lauryl betaine. Moreover, as commercially available products of the amphoteric surfactant, for example, those manufactured by Nikko Chemicals Co., Ltd., Nihon-Emulsion Co., Ltd., Nippon Shokubai Co., Ltd., TOHO Chemical Industry Co., Ltd., Kao Corporation, Adeka Corporation, Lion Corporation, Aoki Oil Industrial Co., Ltd., and Sanyo Chemical Industries, Ltd., can be readily available.

The aforementioned various surfactants may be used individually or in combination. A surfactant, which does not easily solve in the aqueous recording ink, may solve when it is added to the aqueous recording ink in combination with other surfactants, and can be stably present in the aqueous recording ink.

The amount of the surfactant contained in the aqueous recording ink is preferably 0.01% by mass to 3% by mass, more preferably 0.5% by mass to 2% by mass. The total amount of the components (e.g., glycerin and 1,3-butylene glycol) which have a higher boiling point than that of water and remain as liquid in the aqueous recording ink whose temperature is 25° C. is preferably 20% by mass or less, more preferably 15% by mass or less. When the total amount of the surfactant is less than 0.01% by mass, the effect commensurate with the addition of the surfactant may not be attained. When the total amount of the surfactant is more than 3% by mass, the penetration ability of the ink to recording media may be higher than required, which may cause low image density or strike-through.

--Carboxyl Group-Containing Resin--

The aqueous recording ink preferably contains a carboxyl group-containing resin. When the carboxyl group-containing resin is contained in the aqueous recording ink, the carboxyl group-containing resin reacts with an acid contained in the treatment liquid to cause aggregation of the pigment on a recording medium. Therefore, image density and image quality of the resulting image can be improved.

Examples of the carboxyl group-containing resin include maleic acid resins, styrene-maleic acid resins, rosin-modified maleic acid resins, alkyd resins and modified alkyd resins. Examples of commercially available products thereof include MALKYD series manufactured by Arakawa Chemical Industries, Ltd.; and HARIMAX series and HARIPHTHAL series, both manufactured by Harima Chemicals, Inc.

The manner of adding the carboxyl group-containing resin may be suitably selected without any restriction. It may be added in the state such that a pigment serving as the colorant is covered with the carboxyl group-containing resin. Alternatively, it may be added separately from the colorant.

--Other Components--

The aqueous recording ink optionally contains known penetrants, polymer particles, pH regulators, antiseptic/antifungal agents and antirust agents, in addition to the components mentioned above.

As the penetrant, a C8-11 polyol compound or glycol ether compound is preferably used. These penetrants have an effect of increasing a penetrating speed of the ink to paper as well as an effect of preventing bleeding, and are partially water-soluble compounds having a solubility of 0.1% by mass to 4.5% by mass to water having a temperature of 25° C.

Examples of the C8-11 polyol compound include 2-ethyl-1,3-hexanediol and 2,2,4-trimethyl-1,3-pentandiol.

Examples of the glycol ether compound include polyhydric alcohol alkyl ether compounds and polyhydric alcohol aryl ether compounds.

Examples of the polyhydric alcohol alkyl ether include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether.

Examples of the polyhydric alcohol aryl ether include ethylene glycol monophenyl ether and ethylene glycol monobenzyl ether.

These penetrants have a higher boiling point than that of water, and are present as liquid in the ink having a temperature of 25° C. The amount of the penetrant contained in the aqueous recording ink is preferably 0% by mass to 10% by mass, more preferably 0.5% by mass to 5% by mass.

As the polymer particles, those capable of forming a film are used. Here, the phrase "capable of forming a film" means that the polymer particles form a resin film when they are dispersed in water to form an emulsion, and then water is evaporated from the emulsion. Examples of the polymer particles capable of forming a film include polyvinyl acetates.

Such polymer particles function to firmly fix the colorant contained in the aqueous recording ink onto a recording medium by forming a film after volatile substances contained in the aqueous recording ink are evaporated. As a result, images excellent in abrasion resistance and water resistance can be formed.

In order to make the polymer particles form a film at room temperature, the lowest film forming temperature thereof is preferably 30° C. or less, more preferably 10° C. or less. Specific examples of such polymer particles include Landy PL series (manufactured by MIYOSHI OIL AND FAT CO., LTD.). Here, "the lowest film forming temperature" means the lowest temperature at which a transparent continuous film is formed when polymer emulsion obtained by dispersing the polymer particles in water is thinly applied onto a metal sheet, such as an aluminum sheet, and then the temperature thereof is increased.

The volume average particle diameter of the polymer particles are preferably 5 nm to 200 nm, more preferably 10 nm to 100 nm.

As the polymer particles, particles of a monoparticle structure (particles each having a uniform structure as a whole) may be used. For example, if an alkoxysilyl group is contained in an emulsion particle, the alkoxysilyl group is brought into contact with moisture which is left from the fusion of emulsion particles caused by moisture evaporation in the course of coating film formation, and then is hydrolyzed to form a silanol group. If the silanol group remains, the silanol group reacts with an alkoxysilyl group or another silanol group so that a strong crosslinked structure is formed with siloxane bonds. By providing a combination of such reactive functional groups within a polymer particle in this manner, it is possible to form a network structure without using a curing agent by allowing these functional groups to react during film formation.

Moreover, as the polymer particles, polymer particles each having a core-shell structure can be employed. The core-shell structure includes a core and a shell which surrounds the core. The core-shell structure means that two or more polymers each having different formulations are present in each particle in the state of phase separation. Therefore, the core-shell structure includes not only the mode such that a shell completely covers a core, but also the mode such that a shell partially covers a core. Moreover, part of the polymer of the shell may form domains within a core particle. Furthermore, the core-shell structure may be a multilayer structure of three or more layers which further contains one or more layers (which have different formulations) between the core and the shell.

The polymer particles can be obtained by any method known in the art, such as a method in which unsaturated vinyl monomers (unsaturated vinyl polymers) are emulsion polymerized in water in the presence of a polymerization catalyst and an emulsifier.

The amount of the polymer particles contained in the aqueous recording ink is preferably 0.5% by mass to 20% by mass, more preferably 1% by mass to 5% by mass. When the amount is less than 0.5% by mass, abrasion resistance and water resistance may not be sufficiently improved. When the amount is more than 20% by mass, the jetting performance of the ink becomes unstable because of the increased viscosity of the ink or deposition of the polymer components contained in the ink due to drying, which may cause nozzle clogging.

The aforementioned colorant particles (composite pigment particles), in which inorganic particles are each coated with an organic pigment or carbon black, are likely to be acidic when they are mixed and dispersed in water together with an anionic dispersant. Since the anionic dispersant surrounds the surface of the composite pigment dispersed in a medium such as water, it is negatively charged. However, the entire ink is acidic, and thus the medium itself is positively charged. Accordingly, the negative charge on the surface of the particle tends to be neutralized. In such a state, the dispersed particles tend to aggregate, which causes jetting failures. Therefore, it is preferred that the ink be maintained alkaline by adding a pH regulator to stabilize the dispersed state and jetting performance.

The pH value of the aqueous recording ink is preferably 9 to 11. When the pH value thereof is more than 11, the ink may solve a large amount of the materials forming an inkjet head or ink-supplying unit, which causes problems such as deterioration or leakage of the ink, and a jetting failure.

It is preferable that the pH regulator be previously added to water in which the pigment is to be dispersed together with the dispersant. Also, it is preferable that the pH regulator be added together with additives such as a kneading disperser, a wetting agent and a penetrant. This is because the addition of some pH regulators may adversely affect the dispersed state.

Examples of the pH regulator include alcohol amines, alkali metal hydroxides, ammonium hydroxides, phosphonium hydroxides and alkali metal carbonates.

Examples of the alcohol amine include diethanol amine, triethanol amine and 2-amino-2-ethyl-1,3-propandiol.

Examples of the alkali metal hydroxide include lithium hydroxide, sodium hydroxide and potassium hydroxide.

Examples of the ammonium hydroxide include ammonium hydroxide, quaternary ammonium hydroxide and quaternary phosphonium hydroxide.

Examples of the alkali metal carbonate include lithium carbonate, sodium carbonate and potassium carbonate.

Examples of the antiseptic/antifungal agent include sodium dehydroacetate, sodium sorbate, sodium 2-pyridinethiol-1-oxide, sodium benzoate and sodium pentachlorophenol.

Examples of the antirust agent include acid sulfite, sodium thiosulfate, ammonium thiodiglycolate, diisopropyl ammonium nitrite, pentaerythritol tetranitrate and dicyclohexyl ammonium nitrite.

<Cartridge>

An ink cartridge of the present invention contains a container and the aforementioned treatment liquid of the present invention housed in the container; and, if necessary, may further contain other members.

Regarding the container, the shape, structure, size, and material thereof are suitably selected depending on the intended purpose without any restriction. Examples thereof include: a plastic container; and an ink bag formed of an aluminum laminate film, resin film, or the like.

Specific examples thereof include those having the similar structure to that of the treatment liquid cartridge shown in FIG. 5 or 6, which will be described below.

<Image Forming Apparatus>

An image forming apparatus of the present invention contains an image forming unit configured to form an image on a surface of a recording medium by an inkjet recording system, a reservoir unit (optionally provided) configured to reserve a first treatment liquid and a second treatment liquid, and a treatment unit configured to treat the surface of the recording medium using the first treatment liquid and the second treatment liquid, before the image forming by the image forming unit. Moreover, the image-forming unit contains at least an ink-jetting unit, and may contain other units such as a stimulation generating unit and a control unit, if necessary.

FIG. 1 is a schematic view (an explanatory side view) of an example of the image forming apparatus according to the present invention.

An image forming apparatus 101 is equipped with head units 110K, 110C, 110M and 110Y each containing a head for jetting an ink, head maintenance units 111K, 111C, 111M and 111Y, respectively corresponding to each head unit, ink cartridges 107K, 107C, 107M and 107Y for supplying an ink, and sub ink tanks 108K, 108C, 108M and 108Y each storing part of the ink from the respective cartridge and supplying the ink to the respective head with appropriate pressure.

The image forming apparatus 101 further contains: a conveyance belt 113 for conveying a recording medium 114 by sticking the recording medium 114 thereon; conveying rollers 119 and 121 for supporting the conveyance belt 113; a tension roller 115 for controlling that the conveyance belt 113 maintains an appropriate tension; a platen 124 used so that the conveyance belt 113 maintains an appropriate flatness; a charging roller 116 for applying electrostatic charge for sticking the recording medium 114; a paper discharging roller 117 for pressing the recording medium 114; a paper discharging mechanism composed of a paper discharging tray 104 for storing the discharged recording media 114; a paper feeding tray 103 for storing the recording media 114 to be printed; a separation pad 112 for sending the recording media 114 one by one from the paper feeding tray; a counter roller 123 for surely sticking the sent recording media 114 to the charging belt; and a paper feeding mechanism composed of a manual paper feeding tray 105 used when a paper is manually fed.

Furthermore, the image forming apparatus 101 is also equipped with a waste liquid tank 109 for collecting waste liquid discharged after maintenance, and a control panel 106 capable of operating the device and displaying the state of the device.

A nozzle array of each head unit is aligned so as to be orthogonal to the conveyance direction of the recording medium 114, and is formed so as to be longer than a length of a recording region. The recording media 114 stored in the paper feeding tray are separated into one piece by a separation roller, and the separated recording medium 114 is fixed onto the conveyance belt by being pressed on the conveyance belt by a press roller. When the recording medium 114 is passed under the head unit, the recording medium 114 is patterned with droplets at high speed by jetting droplets to the recording medium 114. The recording medium 114 is then separated from the conveyance belt by a separation craw, and discharged as a recorded matter into a paper-discharging tray by a discharging roller and another discharging roller.

Figure 8:
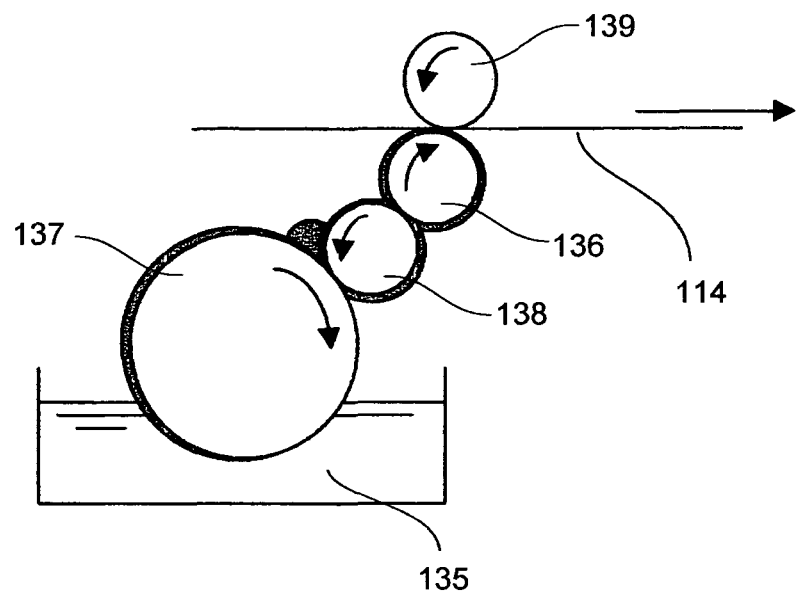
FIG. 8 is another treatment liquid coating mechanism (which uses three rollers).

For this device, a coating system is provided as a system for treating a surface of a recording medium with a treatment liquid, and uses roller coating. A treatment liquid coating mechanism through roller coating (which uses three rollers) is shown in FIG. 8. After bubbled with an unillustrated air blow mechanism, the treatment liquid 135 is taken out to a surface of a roller by a pumping roller 137, and is transferred to a film thickness controlling roller 138. The treatment liquid then transferred to an application roller 136 is transferred and applied to the recording medium 114 which is passed between the application roller 136 and a counter application roller 139.

The amount of the treatment liquid transferred to the application roller 136 is controlled by adjusting the nip pressure with the film thickness controlling roller 138. When an application of the treatment liquid is not desirable, the treatment liquid present on a surface of the application roller can be scraped by pressing a movable blade 134 against the application roller 136 so as not to leave the treatment liquid on the application roller 136. In this manner, functional disorders caused by the residual treatment liquid on the application roller 136 (e.g., increased viscosity due to the dried treatment liquid, bonding to the counter application roller 139, and uneven application) can be prevented in advance.

Figure 9:
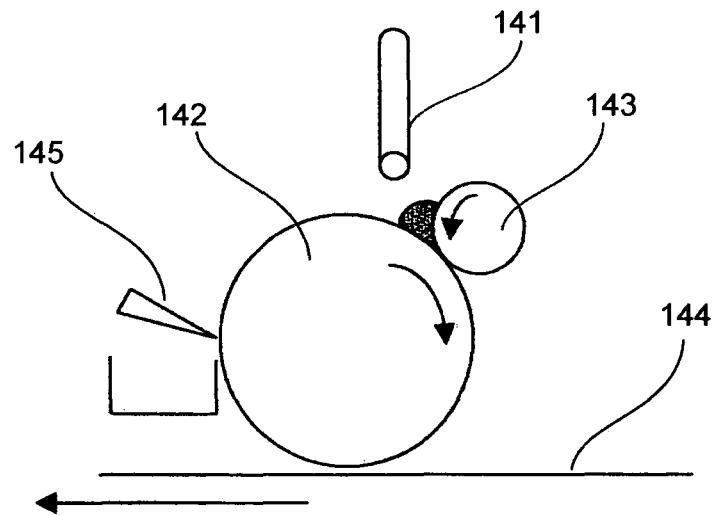
FIG. 9 is yet another treatment liquid coating mechanism (which uses two rollers).

Alternatively, there can be employed another treatment liquid coating mechanism through roller coating (which uses two rollers) shown in FIG. 9. In this mechanism, the treatment liquid is supplied from a treatment liquid supplying nozzle 141 to between an application roller 142 and a film thickness controlling roller 143. The treatment liquid supplied onto the application roller 142 is then transferred and applied onto a recording medium 144. The amount of the treatment liquid transferred onto the recording medium 144 is controlled by adjusting the nip pressure between the application roller 142 and the film thickness controlling roller 143. When an application of the treatment liquid is not desirable, the treatment liquid present on a surface of the application roller 142 can be scraped by pressing a movable blade 145 against the application roller 142.

Figure 7:
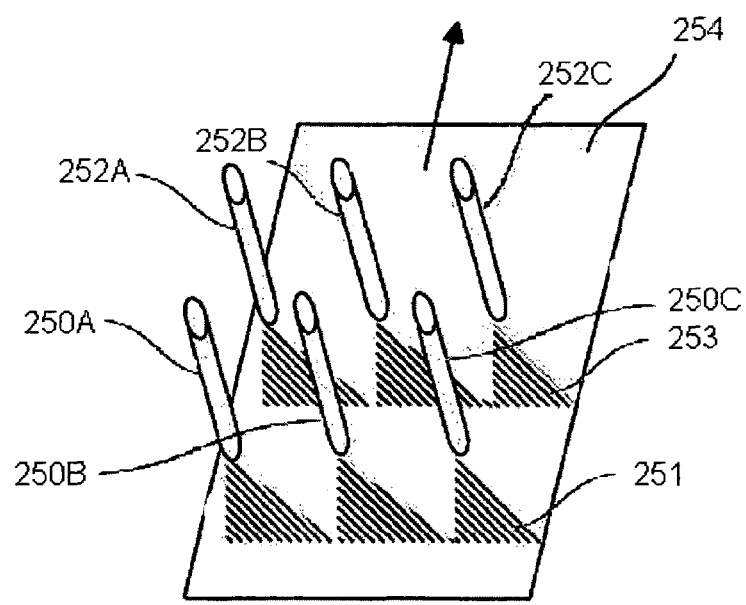
FIG. 7 illustrates a treatment liquid coating mechanism (which jets the treatment liquid from jetting heads).

Other than the aforementioned roller coating, the treatment liquid can also be spray-coated by an inkjet method. For example, the treatment liquid is charged in a head having the similar configuration to that of 110K, and then jetted to a recording medium 114 in the same manner as when the ink is jetted. The control of the jetting amount or position can be easily, highly precisely controlled. FIG. 7 illustrates the above-described treatment liquid coating mechanism which jets the treatment liquid from jetting heads. In this mechanism, a treatment liquid 251 is jetted from treatment liquid jetting heads 250A, 250B and 250C toward a recording medium 254 conveyed in a direction indicated by the arrow in FIG. 7, whereby the treatment liquid is applied onto the recording medium. Subsequent to the application of the treatment liquid, an ink 253 is jetted from ink jetting heads 252A, 252B and 252C toward the recording medium, whereby the ink is applied onto the recording medium.

Whichever method is used, the treatment liquid can be applied to a desired position in a desired amount.

The above-described treatment step is advantageously performed on both a drying recording medium and a recording medium whose surface has been sufficiently dried. If necessary, a drying step may be provided for drying the thus-treated recording medium. In this drying step, the recording medium can be dried with a roll heater or a drum heater, or through application of hot air.

Notably, the treatment step is preferably a pre-treatment step performed before an ink-jetting step, but may be a post-treatment step performed after the ink-jetting step. Alternatively, the treatment step may be performed simultaneously with the ink-jetting step. In other words, the treatment liquid is preferably a pre-treatment liquid applied before the ink-jetting step, but may be a post-treatment liquid applied after the ink-jetting step. Alternatively, the treatment liquid may be that applied simultaneously with the ink-jetting step.

The wet deposition amount of the liquid jetting device treatment liquid on the recording medium in the above treatment step is preferably in the range of 0.1 g/m$^2$ to 30.0 g/m$^2$.

Figure 3:
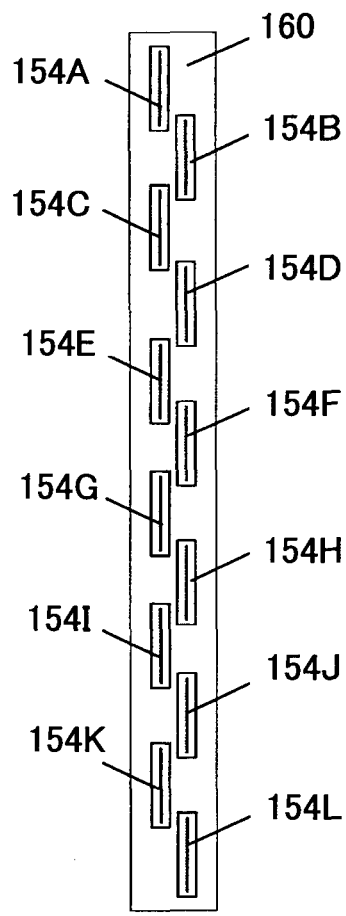
FIG. 3 is a schematic view of one example of a head arrangement on a head unit of the image forming apparatus.

FIG. 3 is a schematic view of one example of a head arrangement on a head unit of the image forming apparatus.

The head unit contains heads 154A to 154L fixed on a head circumferential member 160, and the heads are fixed with a staggered arrangement so that the heads overlap with part of nozzle.

Figure 4:
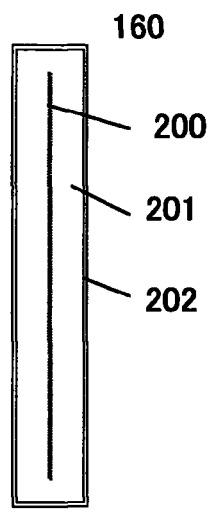
FIG. 4 is a schematic enlarged view of the head on the head unit of FIG. 3.

FIG. 4 is a schematic enlarged view of the head on the head unit of FIG. 3. Each head has a nozzle 200 which is two arrays of openings provided in a nozzle plate 201 in a staggered arrangement. The head and the head circumferential member are sealed with a filler 202 to remove any space on the nozzle surface.

Figure 2:
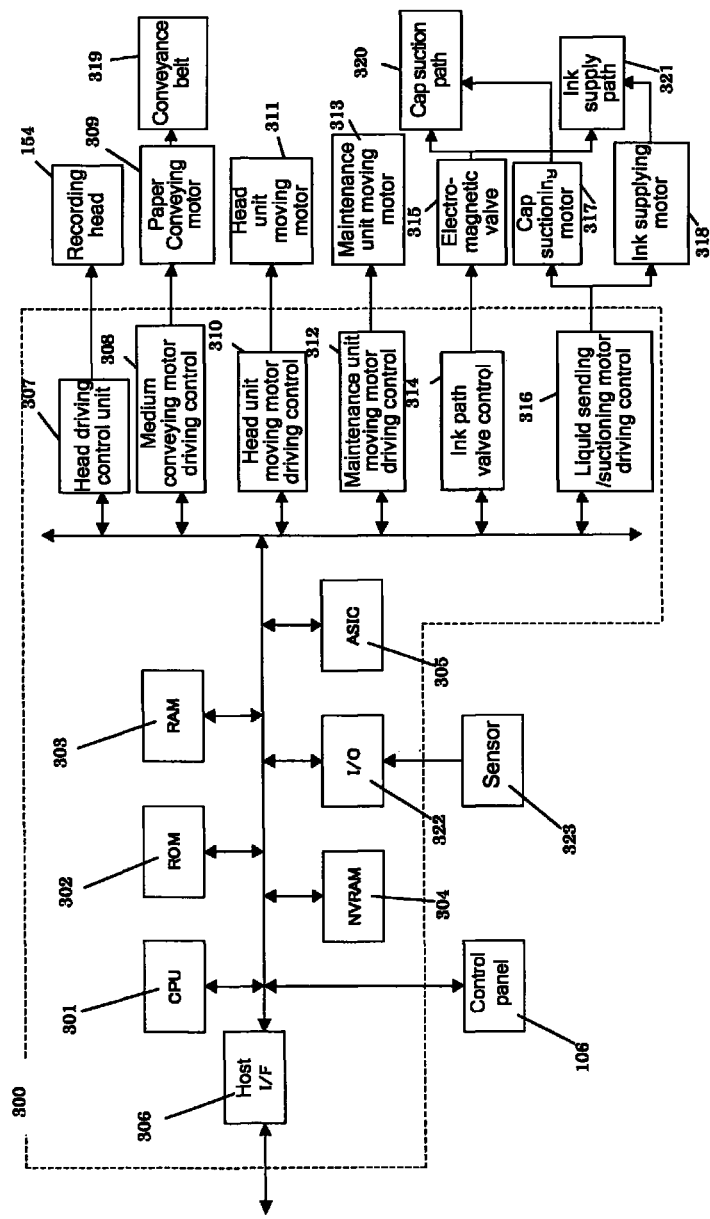
FIG. 2 is a simplified block diagram of a control unit.

The outline of the control unit of the image forming apparatus shown in FIG. 1 will be next described with reference to FIG. 2. Note that, FIG. 2 is a schematic block explanatory diagram of the control unit.

The control unit 300 contains: CPU 301 for controlling the entire device; ROM 302 for storing a program CPU 301 executes, and fixed data such as a value for a contamination degree of a nozzle surface relative to an ejection of the ink used in the present invention, a threshold value for the contamination degree of the nozzle surface, and data for a driving wave; RAM 303 for temporarily storing image data and the like; a nonvolatile memory (NVRAM) 304 for keeping data while a power source of the device is shut out; and ASIC 305 for processing input/output signals, such as various signals for the image data and image processing for replacing positions of images, and other input/output signals for controlling the entire device.

Moreover, the control unit 300 contains: a host I/F 306 for sending and receiving data and signals to and from a host; a head drive controlling unit 307 for generating a drive wave for driving and controlling a pressure generating unit of the recording head 154; a recording medium conveying motor driving unit 308 for driving a recording medium conveying motor 309; a head unit moving motor drive controlling unit 312 and a maintenance unit moving motor drive controlling unit 310 for driving a head unit (carriage) moving motor 311; a maintenance unit moving motor 313; an ink channel valve controlling unit 314 for controlling opening and closing of an electromagnetic valve 315 of an ink channel; a delivery/suction motor drive controlling unit 316 for controlling driving of a cap suction motor 317 or ink supplying motor 318; and I/O 322 for inputting detecting signals from an encoder which outputs a detecting signal corresponding to a traveling amount and speed of the conveyance belt 113, detecting signals from a sensor 323 for detecting temperature and humidity environment (or can be either of them), detecting signals on the ink level of each subtank, and detecting signals from various sensors not shown in the diagram. The control unit 300 is connected to a control panel 106 to or on which information necessary to the device is input or displayed.

The control unit 300 receives at the host I/F 306 printing data and the like from a host via a cable or net, and in this case the host is such as an information-processing device (e.g., a personal computer), an image scanning device (e.g., an image scanner), and an imaging device (e.g., a digital camera).

CPU 301 reads out printing data into a receiving buffer contained in the host I/F 306 and analyzes the data, optionally makes the data to image-processed or repositioned by ASIC 305, synchronizes the image data (i.e. dot pattern data) which equivalent of one page for a head width of the recording head 154 with respect to a clock signal, and output the signal to the head drive controlling unit 307.

Then, CPU 301 reads out printing data in the receiving buffer contained in the host I/F 306 and analyzes it. After carrying out necessary image processing or repositioning of the data by ASIC 305, the image data is output to the head drive controlling unit 307. Note that, the formation of the dot pattern data for image output may be stored as font data in, for example, ROM 302. Alternatively, the image data may be expanded to bit map data by a printer driver at the host side, and the bit map data may be output to the device.

The head drive controlling unit 307 selectively applies voltage to a pressure generating unit of the recording head 154 based on the image data (i.e., the dot pattern data) for one page of the recording head 154 input per page, and drives the recording head 154.

Although it is not shown in the diagram, in the case where the treatment liquid is coated by a roller, a control unit of a motor for application, a motor to be controlled, and a sensor for controlling are provided in the device, as it is necessary to control driving of a group of rollers for application, such as an application roller.

Furthermore, in the case where the treatment liquid is applied by an inkjet method, there is a possibility to cause nozzle clogging due to mixing with other colors, unless the maintenance operation is performed in a different manner from that of the other inks. Therefore, it is desirable that a maintenance unit moving motor is provided for the treatment liquid, separately from that for the ink.

The treatment liquid ink cartridge will next be described with reference to FIGS. 5 and 6. FIG. 5 is a schematic view of one example of a treatment liquid cartridge of the present invention. FIG. 6 is a schematic view of a treatment liquid cartridge of the present invention housed in a case (exterior).

Figure 5:
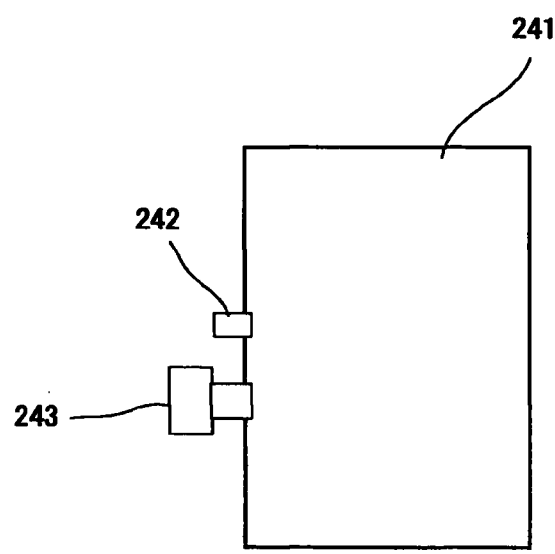
FIG. 5 is a schematic view of one example of a treatment liquid cartridge of the present invention.
Figure 6:
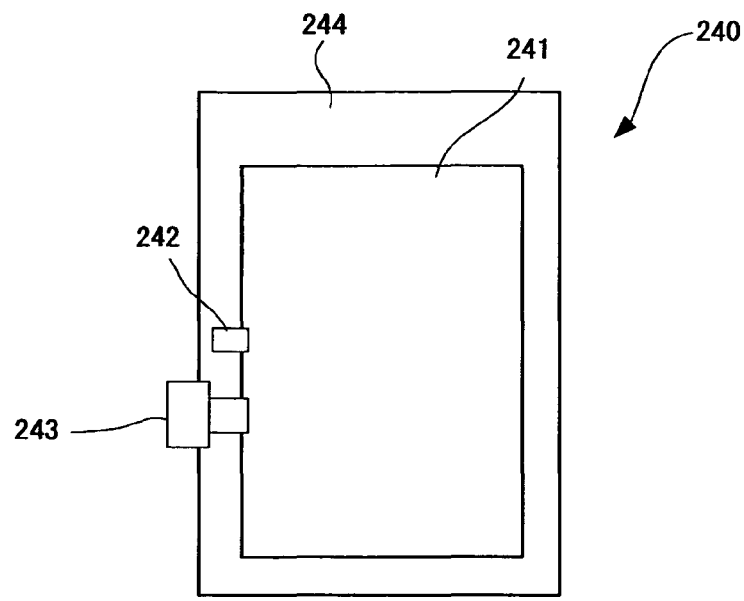
FIG. 6 is a schematic view of a treatment liquid cartridge of the present invention housed in a case (exterior).

As shown in FIG. 5, the treatment liquid is introduced into a treatment liquid bag 241 from a treatment liquid inlet 242. After removing the inner gas from the treatment liquid bag, the treatment liquid inlet 242 is closed by fusing. When the treatment liquid cartridge is used, the treatment liquid cartridge is set in the device by inserting a needle equipped with the body of the device into a treatment liquid outlet 243 formed of a rubber member to supply the treatment liquid to the device. The treatment liquid bag 241 is formed of an airtight wrapping member such as an aluminum laminate film. As shown in FIG. 6, this treatment liquid bag 241 is accommodated in the cartridge case 244 generally made of plastic, and as the treatment liquid cartridge 240, it is detachably mounted to various image forming apparatuses.

Moreover, when, the ink, instead of the treatment liquid, is placed in the aforementioned treatment liquid cartridge 240, the cartridge can be used as a cartridge for the ink. In this case, the treatment liquid cartridge can be also detachably mounted to various image forming apparatuses, similar to the treatment liquid cartridge.

EXAMPLES

The present invention will be described in more detail by way of Examples and Comparative Examples, but should not be construed as being limited to Examples.

As shown in Tables 1, 2-1, 2-2, 3-1 and 3-2, a treatment liquid of each of Examples and Comparative Examples was prepared by mixing materials shown in the treatment liquid formulations. The thus-prepared treatment liquid was uniformly coated onto a recording medium (My Paper, manufactured by Ricoh Co. Ltd.) using a wire bar (wound wire diameter: 0.02 mm) (manufactured by Kobayashi Engineering Works., Ltd.).

Next, an aqueous recording ink was jetted out to the recording medium at a printing speed of 30 rpm following a predetermined image using an image forming apparatus (IPSIO GX5000, manufactured by Ricoh Co. Ltd.) to form a sample print. The aqueous recording ink used was GX cartridge (Magenta GC21MH, manufactured by Ricoh Co. Ltd.).

Various properties of each print sample then were evaluated using the following methods.

<Transfer Density>

A solid portion of the print sample was rubbed against a cloth attached onto a clock meter (manufactured by TOYO SEIKI SEISAKU-SHO, LTD.) and the transfer density of the ink on the cloth after rubbing was measured using a spectrodensitometer (939) manufactured by X-Rite. The lower the transfer density, the more preferable the fixability of the image.

<Image Density>

A solid portion of the print sample was measured using a spectrodensitometer (939) manufactured by X-Rite. The samples exhibiting greater values are more preferred.

<Static Surface Tension>

Each of the treatment liquids mixed/prepared based on the formulation of Examples and Comparative Examples was measured using a fully-automatic surface tension meter (CBVP-Z, KYOWA INTERFACE SCIENCE Co. Ltd.). The main solvent used was a composition composed of water, glycerin and 1,3-butylene glycol. The treatment liquid having a static surface tension of 30 mN/m or lower was judged as having good wetability.

<Evaluation of Foaming>

Each treatment liquid (10 mL) mixed/prepared based on the formulation of Examples and Comparative Examples was placed in a 100 mL-measuring cylinder, and left to stand for one day. Afterward, the measuring cylinder was placed in a thermostat water bath of 10° C. for 30 minutes or longer so that the liquid temperature was entirely constant. After the liquid temperature had sufficiently become constant, air was blown with a predetermined syringe to generate foam up to 100 mL. After 30 seconds from foam generation, the level of the foam was visually confirmed. The treatment liquid generating foam at a level of 50 mL or lower after 30 sec was judged as having a good effect of suppressing foam generation.

<Surfactant Solubility>

The surfactant was solved into the main solvent and the solubility thereof was judged visually. The main solvent was a composition composed of water, glycerin and 1,3-butylene glycol as shown in Tables 3-1 and 3-2.

A: Solved completely (transparent and colorless)
B: Did not solve completely, but mostly (a bit cloudy)
C: Did not solve (cloudy)

The treatment liquid formulations and evaluation results for Examples 1 to 21 and Comparative Examples 1 to 12 are shown in Tables 1, 2-1, 2-2, 3-1 and 3-2.

The LP-300 (N-dodecyl-2-pyrrolidone) described in Tables 3-1 and 3-2 has a long alkyl chain (12 carbon atoms) and so it cannot solve in the main solvent (water, glycerin and 1,3-butylene glycol). If it does not completely solve, this can lead to problems such as clogging of the jetting heads with unsolved matter of the surfactant. So, the cases using the LP-100 which solves in the main solvent are Examples, and the cases using LP-300 (N-dodecyl-2-pyrrolidone) which does not solve are Comparative Examples.

Glycerin and 1,3-butylene glycol in Tables 3-1 and 3-2 are added to improve storage of the treatment liquid. Also, the composition of water, glycerin and 1,3-butylene glycol is the main solvent of the treatment liquid of the present invention, and so, in Tables 3-1 and 3-2, evaluation is made on the solubility of the LP-100 and LP-300 with respect to the main solvent.

As described below, DSN-403N, TF-2066 and FS-300 are fluorine-containing surfactants, and are represented by General Formula (2). On the other hand, New Coal 2304-Y is an alkyl ether-type surfactant. And, all units shown in the Tables are units of % by mass.

TABLE 1

| | | | | | | |
|---|---|---|---|---|---|---|
| | | <Formulation of Treatment Liquid> | | | | |
| | | Comp. Ex. 1 | Comp. Ex. 2 | Comp. Ex. 3 | Comp. Ex. 4 | Comp. Ex. 5 |
| Water-soluble organic solvent | Glycerin | 27.5 | 27.5 | 27.5 | 27.5 | 27.5 |
| | 1,3-Butylene glycol | 27.5 | 27.5 | 27.5 | 27.5 | 27.5 |
| Surfactant | New Coal 2304-Y | 0.50 | | | | |
| | TF-2066 | | 0.50 | | | |
| | FS-300* | | | 1.25 (0.50) | | |
| | DSN-403N | | | | 0.50 | |
| | LP-100 | | | | | 0.35 |

TABLE 1-continued

| | | \<Formulation of Treatment Liquid\> | | | | |
|---|---|---|---|---|---|---|
| | | Comp. Ex. 1 | Comp. Ex. 2 | Comp. Ex. 3 | Comp. Ex. 4 | Comp. Ex. 5 |
| Acid | Lactic acid | 1.0 | 1.0 | 1.0 | 1.0 | 1.0 |
| Multivalent metal salt | $CaCl_2$ solution | | | | | |
| Water | Ion-exchange water | 43.5 | 43.5 | 42.8 | 43.5 | 43.5 |
| | Total | 100.0 | 100.0 | 100.0 | 100.0 | 100.0 |
| Transfer density Image density | | 0.203 | 0.169 | 0.189 | 0.161 | 0.204 |
| Static surface tension [mN/m] | | 29.4 | 18.9 | 22.9 | 17.1 | 29.0 |
| Level of foam after 30 sec [mL] | | 70 | 90 | 90 | 90 | 70 |
| Total amount of surfactant [% by mass] | | 0.5 | 0.5 | 0.5 | 0.5 | 0.5 |
| Amount of fluorine-containing surfactant in total surfactant [%] | | 0 | 100 | 100 | 100 | 0 |

*In the table, the value in parentheses is a solid content concentration (% by mass)

TABLE 2-1

| | | \<Formulation of Treatment Liquid\> | | | | | | |
|---|---|---|---|---|---|---|---|---|
| | | Ex. 1 | Ex. 2 | Ex. 3 | Ex. 4 | Ex. 5 | Ex. 6 | Ex. 7 |
| Water-soluble organic solvent | Glycerin | 27.5 | 27.5 | 27.5 | 27.5 | 27.5 | 27.5 | 27.0 |
| | 1,3-Butylene glycol | 27.5 | 27.5 | 27.5 | 27.5 | 27.5 | 27.5 | 27.0 |
| Surfactant | New Coal 2304-Y | | | | | | | |
| | TF-2066 | | 0.15 | | | | | |
| | FS-300* | | | 0.38 (0.15) | | | | |
| | DSN-403N | | | | 0.03 | 0.15 | 0.30 | 0.45 |
| | LP-100 | 0.50 | 0.35 | 0.35 | 0.07 | 0.35 | 0.70 | 1.05 |
| Acid | Lactic acid | 1.0 | 1.0 | 1.0 | 1.0 | 1.0 | 1.0 | 1.0 |
| Multivalent metal salt | $CaCl_2$ solution | | | | | | | |
| Water | Ion-exchange water | 43.5 | 43.5 | 43.3 | 43.9 | 43.5 | 43.0 | 43.5 |
| | Total | 100.0 | 100.0 | 100.0 | 100.0 | 100.0 | 100.0 | 100.0 |
| Transfer density | | 0.203 | 0.178 | 0.192 | 0.182 | 0.176 | 0.173 | 0.172 |
| Image density | | | | | | 1.083 | | 1.078 |
| Static surface tension [mN/m] | | 28.9 | 20.8 | 25.2 | 21.2 | 19.3 | 19.0 | 18.9 |
| Level of foam after 30 sec [mL] | | 0 | 0 | 0 | 0 | 0 | 0 | 0 |
| Total amount of surfactant [% by mass] | | 0.5 | 0.5 | 0.5 | 0.1 | 0.5 | 2.0 | 1.5 |
| Amount of fluorine-containing surfactant in total surfactant [%] | | 0 | 30 | 30 | 30 | 30 | 30 | 30 |

*In the table, the value in parentheses is a solid content concentration (% by mass)

TABLE 2-2

| | | \<Formulation of Treatment Liquid\> | | | | | | |
|---|---|---|---|---|---|---|---|---|
| | | Ex. 8 | Ex. 9 | Ex. 10 | Ex. 11 | Ex. 12 | Ex. 13 | Ex. 14 |
| Water-soluble organic solvent | Glycerin | 26.5 | 27.5 | 27.5 | 27.5 | 27.5 | 27.5 | 27.5 |
| | 1,3-Butylene glycol | 26.5 | 27.5 | 27.5 | 27.5 | 27.5 | 27.5 | 27.5 |
| Surfactant | New Coal 2304-Y | | | | | | | |
| | TF-2066 | | | | | | | |
| | FS-300* | | | | | | | |

TABLE 2-2-continued

<Formulation of Treatment Liquid>

|  |  | Ex. 8 | Ex. 9 | Ex. 10 | Ex. 11 | Ex. 12 | Ex. 13 | Ex. 14 |
|---|---|---|---|---|---|---|---|---|
|  | DSN-403N | 0.60 | 0.20 | 0.15 | 0.22 | 0.90 | 0.15 | 0.15 |
|  | LP-100 | 1.40 | 0.30 | 0.35 | 0.28 | 2.10 | 0.35 | 0.35 |
| Acid | Lactic acid | 1.0 | 1.0 | 1.0 | 1.0 | 1.0 |  |  |
| Multivalent metal salt | $CaCl_2$ solution |  |  |  | 1.0 |  |  | 1.0 |
| Water | Ion-exchange water | 44.0 | 43.5 | 42.5 | 43.5 | 41.0 | 44.5 | 43.5 |
|  | Total | 100.0 | 100.0 | 100.0 | 100.0 | 100.0 | 100.0 | 100.0 |
| Transfer density |  | 0.168 | 0.17 | 0.189 | 0.167 | 0.168 |  | 0.178 |
| Image density |  |  |  | 1.091 | 1.077 | 1.075 | 0.961 | 1.085 |
| Static surface tension [mN/m] |  | 18.6 | 18.6 | 19.6 | 18.5 | 18.5 | 19.4 | 19.4 |
| Level of foam after 30 sec [mL] |  | 0 | 0 | 0 | 30 | 20 | 0 | 0 |
| Total amount of surfactant [% by mass] |  | 2.0 | 0.5 | 0.5 | 0.5 | 3.0 | 0.5 | 0.5 |
| Amount of fluorine-containing surfactant in total surfactant [%] |  | 30 | 40 | 30 | 44 | 30 | 30 | 30 |

TABLE 3-1

<Solubility of N-Alkyl-2-Pyrrolidone to Solvent>

|  |  | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|
| Water-soluble organic solvent | Glycerin | 8.0 | 8.0 | 8.0 | 8.0 | 8.0 | 8.0 | 8.0 |
|  | 1,3-Butylene glycol | 23.0 | 23.0 | 23.0 | 23.0 | 23.0 | 23.0 | 23.0 |
| Surfactant | LP-100 |  |  |  |  |  |  |  |
|  | LP-300 | 0.01 | 0.05 | 0.10 | 0.30 | 0.50 | 1.00 | 1.50 |
| Water | Ion-exchange water | 69.0 | 69.0 | 68.9 | 68.7 | 68.5 | 68.0 | 67.5 |
|  | Total | 100.0 | 100.0 | 100.0 | 100.0 | 100.0 | 100.0 | 100.0 |
| Static surface tension [mN/m] |  | 27.2 | 27.2 | 27.4 | 26.9 | 26.8 | 27.1 | 26.9 |
| Solubility of surfactant |  | C | C | C | C | C | C | C |

TABLE 3-2

<Solubility of N-Alkyl-2-Pyrrolidone to Solvent>

|  |  | Ex. 15 | Ex. 16 | Ex. 17 | Ex. 18 | Ex. 19 | Ex. 20 | Ex. 21 |
|---|---|---|---|---|---|---|---|---|
| Wetting agent | Glycerin | 8.0 | 8.0 | 8.0 | 8.0 | 8.0 | 8.0 | 8.0 |
|  | 1,3-Butylene glycol | 23.0 | 23.0 | 23.0 | 23.0 | 23.0 | 23.0 | 23.0 |
| Surfactant | LP-100 | 0.01 | 0.05 | 0.10 | 0.30 | 0.50 | 1.00 | 1.50 |
|  | LP-300 |  |  |  |  |  |  |  |
| Water | Ion-exchange water | 69.0 | 69.0 | 68.9 | 68.7 | 68.5 | 68.0 | 67.5 |
|  | Total | 100.0 | 100.0 | 100.0 | 100.0 | 100.0 | 100.0 | 100.0 |
| Static surface tension [mN/m] |  | 44.5 | 32.9 | 30.3 | 29.7 | 29.2 | 29.1 | 29.2 |
| Solubility of surfactant |  | A | A | A | A | A | A | A |

<Raw Materials Used>

Glycerin: manufactured by SAKAMOTO YAKUHIN KOGYO Co. Ltd.

1,3-Butylene Glycol: manufactured by KANTO KAGAKU Co. Ltd.

New Coal 2304-Y (Alkyl Ethyl-type Surfactant): manufactured by NIPPON NYUUKAZAI Co. Ltd.

TF-2066 (Fluorine-containing surfactant): manufactured by DIC Co. Ltd. (MEGAFAC TF-2066)

FS-300 (Fluorine-containing surfactant): Zonyl FS-300 (Component: 40% by mass) manufactured by DUPON Co. Ltd.

DSN-403N (Fluorine-containing surfactant) [Compound represented by General Formula 3]: UNIDYNE DSN-403N manufactured by DAIKIN Co. Ltd.

LP-100 (Pyrrolidone-type surfactant): SURFADONE LP-100 (N-Octyl-2-Pyrrolidone 100%) manufactured by ISP JAPAN Co. Ltd.
LP-300 (Pyrrolidone-type surfactant): SURFADONE LP-300 (N-Dodecyl-2-Pyrrolidone 100%) manufactured by ISP JAPAN Co. Ltd.
Lactic Acid: manufactured by KANTO KAGAKU Co. Ltd.
Calcium Chloride: manufactured by KANTO CHEMICAL Co. Ltd. (Calcium Chloride Dihydrate)

From comparison of Comparative Examples 1 to 4 with Examples 1 to 14, by incorporating N-octyl-2-pyrrolidone, or, both a fluorine-containing surfactant and N-octyl-2-pyrrolidone, foam generation can be remarkably suppressed and low surface tension can be ensured.

From comparison of Comparative Examples 6 to 12 with Examples 15 to 21, by the N-alkyl-2-pyrrolidone being N-octyl-2-pyrrolidone, the solubility with respect to the solvent can be ensured while foam generation can be remarkably suppressed.

From Examples 5, 9 and 11, by setting the amount of the fluorine-containing surfactant to 40% by mass or lower with respect to the total amount of the fluorine-containing surfactant and N-octyl-2-pyrrolidone, low surface tension can be maintained while foam generation can be remarkably suppressed.

From Examples 5 to 8 and 12, by setting the total amount of the fluorine-containing surfactant and N-octyl-2-pyrrolidone to 2% by mass or lower with respect to the total amount of the treatment liquid, low surface tension can be maintained while foam generation can be remarkably suppressed.

From Examples 5, 10, 13 and 14, by adding at least one of the acid and the multivalent metal salt to the treatment liquid, image density could be remarkably improved.

By adding a water-soluble organic solvent to the treatment liquid, evaporation of moisture of the treatment liquid can be suppressed and degradation due to leaving over a long period can be prevented.

REFERENCE SIGNS LIST

101: Image Forming Apparatus
103: Paper Feeding Tray
104: Paper Discharging Tray
105: Manual Paper Feeding Tray
106: Control Panel
107K: Ink Cartridge
107C: Ink Cartridge
107M: Ink Cartridge
107Y: Ink Cartridge
108K: Sub Ink Tank
108C: Sub Ink Tank
108M: Sub Ink Tank
108Y: Sub Ink Tank
109: Waste Liquid Tank
110K: Head Unit
110C: Head Unit
110M: Head Unit
110Y: Head Unit
111K: Maintenance Unit
111C: Maintenance Unit
111M: Maintenance Unit
111Y: Maintenance Unit
112: Separation Pad
113: Conveyance Belt
114: Recording Medium
115: Tension Roller
116: Charging Roller
117: Paper Discharging Roller
118: Platen Roller
119: Conveying Roller
120: Suction Fan
121: Conveying Roller
122: Separation Pad
123: Counter Roller
124: Platen
134: Movable Blade
135: Treatment Liquid
136: Application Roller
137: Pumping Roller
138: Film Thickness Controlling Roller
139: Counter Application Roller
140: Liquid Jetting Device Treatment Liquid Tank
141: Treatment Liquid Supplying Nozzle
142: Application Roller
143: Film Thickness Controlling Roller
144: Recording Medium
145: Movable Blade
154A: Head
154B: Head
154C: Head
154D: Head
154E: Head
154F: Head
154G: Head
154H: Head
154I: Head
154J: Head
154K: Head
154L: Head
160: Head Circumferential Member
200: Nozzle
201: Nozzle Plate
202: Filler
240: Treatment Liquid Cartridge
241: Treatment Liquid Bag
242: Treatment Liquid Inlet
243: Treatment Liquid Outlet
244: Cartridge Case
150A: Treatment Liquid Jetting Head
150B: Treatment Liquid Jetting Head
150C: Treatment Liquid Jetting Head
251: Treatment Liquid
252A: Ink Jetting Head
252B: Ink Jetting Head
252C: Ink Jetting Head
253: Ink
300: Control Unit

The invention claimed is:

1. An image forming method comprising:
applying a treatment liquid to a recording medium; and
ejecting an ink to the recording medium to which the treatment liquid has been applied,
wherein the treatment liquid comprises no colorant and comprises a N-alkyl-2-pyrrolidone of Formula 1:

Formula 1 where R is an alkyl group having 8 to 11 carbon atoms.

2. The method of claim 1, wherein the treatment liquid further comprises a surfactant comprising fluorine.

3. The method of claim 2, wherein the surfactant has a Griffin's HLB value of 10 to 16 and has Formula 2:

$C_nF_{2n+1}$—$CH_2CH(OH)CH_2O$—$(CH_2CH_2O)_a$—Y   General Formula 2 where n is an integer of 2 to 6, a is an integer of 15 to 50, and Y represents —$C_bH_{2b+1}$, where b is an integer of 11 to 19; or Y represents —$CH_2CH(OH)CH_2$—$C_mF_{2m+1}$, where m is an integer of 2 to 6.

4. The method of claim 3, wherein n is an integer of 4 to 6.

5. The method of claim 3, wherein a is an integer of 20 to 25.

6. The method of claim 2, wherein the surfactant has Formula 3:

$C_4F_9$—$CH_2CH(OH)CH_2O$—$(CH_2CH_2O)_{23}$—$CH_2CH(OH)CH_2$—$C_4F_9$   General Formula 3.

7. The method of claim 2, wherein the treatment liquid comprises 40% by mass or less of the surfactant with respect to a total amount of the surfactant and the N-alkyl-2-pyrrolidone.

8. The method of claim 2, wherein the treatment liquid comprises 2% by mass or less of a total amount of the surfactant and the N-alkyl-2-pyrrolidone with respect to a total amount of the treatment liquid.

9. The method of claim 2, wherein the treatment liquid comprises 30% by mass or less of the surfactant with respect to a total amount of the surfactant and the N-alkyl-2-pyrrolidone.

10. The method of claim 2, wherein the treatment liquid comprises 1% by mass or less of a total amount of the surfactant and the N-alkyl-2-pyrrolidone with respect to a total amount of the treatment liquid.

11. The method of claim 1, wherein the N-alkyl-2-pyrrolidone is N-octyl-2-pyrrolidone.

12. The method of claim 1, wherein the treatment liquid further comprises an acid.

13. The method of claim 12, wherein the acid is lactic acid.

14. The method of claim 1, wherein the treatment liquid further comprises a multivalent metal salt.

15. The method of claim 14, wherein the multivalent metal salt is calcium chloride.

16. The method of claim 1, wherein the treatment liquid further comprises a water-soluble organic solvent.

17. The method of claim 16, wherein the water-soluble organic solvent comprises glycerin, 1,3-butylene glycol, or both.

18. The method of claim 1, wherein the treatment liquid comprises 0.05% by mass or more of the N-alkyl-2-pyrrolidone with respect to a total amount of the treatment liquid.

19. A cartridge comprising:
a container, and
a liquid jetting device treatment liquid which is housed in the container,
wherein the liquid jetting device treatment liquid comprises no colorant and comprises a N-alkyl-2-pyrrolidone of Formula 1:

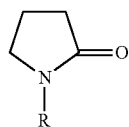

Formula 1 where R is an alkyl group having 8 to 11 carbon atoms.

20. An image forming apparatus comprising:
a cartridge, wherein the cartridge comprises:
a container, and
a liquid jetting device treatment liquid which is housed in the container,
wherein the liquid jetting device treatment liquid comprises no colorant and comprises a N-alkyl-2-pyrrolidone of Formula 1:

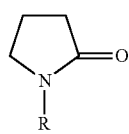

Formula 1 where R is an alkyl group having 8 to 11 carbon atoms.

* * * * *